United States Patent
Suzuki et al.

(10) Patent No.: US 9,246,344 B2
(45) Date of Patent: Jan. 26, 2016

(54) CHARGING METHOD FOR NON-AQUEOUS ELECTROLYTE SECONDARY BATTERY, AND BATTERY PACK

(75) Inventors: Tatsuhiko Suzuki, Osaka (JP); Akira Nagasaki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 199 days.

(21) Appl. No.: 14/001,834

(22) PCT Filed: Feb. 20, 2012

(86) PCT No.: PCT/JP2012/001121
§ 371 (c)(1),
(2), (4) Date: Aug. 27, 2013

(87) PCT Pub. No.: WO2012/127775
PCT Pub. Date: Sep. 27, 2012

(65) Prior Publication Data
US 2013/0335034 A1 Dec. 19, 2013

(30) Foreign Application Priority Data
Mar. 18, 2011 (JP) ................................. 2011-060216

(51) Int. Cl.
*H02J 7/00* (2006.01)
*H01M 4/525* (2010.01)
(Continued)

(52) U.S. Cl.
CPC ............. *H02J 7/0052* (2013.01); *H01M 4/525* (2013.01); *H01M 10/0525* (2013.01); *H01M 10/44* (2013.01); *H01M 10/441* (2013.01); *Y02E 60/122* (2013.01)

(58) Field of Classification Search
CPC ............ B60L 11/1809; B60L 11/1818; B60L 11/1838; B60L 2230/12; H01R 13/703; H01R 31/06; H02J 7/0036; H02J 7/0052; Y02T 90/121; H01M 10/0525; H01M 10/44; H01M 10/441; H01M 4/525; Y02E 60/122
USPC .................................................. 320/109, 160
See application file for complete search history.

(56) References Cited

U.S. PATENT DOCUMENTS

2010/0207583 A1 8/2010 Tanaka et al.
2011/0181249 A1* 7/2011 Deguchi et al. ............... 320/149
(Continued)

FOREIGN PATENT DOCUMENTS

JP 07-296853 A 11/1995
JP 10-145979 A 5/1998
(Continued)

OTHER PUBLICATIONS

International Search Report issued on PCT/JP2012/001121, dated May 15, 2012.

*Primary Examiner* — Vuthe Siek
(74) *Attorney, Agent, or Firm* — McDermott Will & Emery LLP (57) ABSTRACT

Disclosed is a charging method for one or more non-aqueous electrolyte secondary batteries by n steps of constant-current charging processes, where n is an integer equal to or greater than 2. The n steps include: (1) charging the secondary batteries at a current $Ic(k)$ until a charge voltage per one battery reaches a voltage $Ec(k)$, where k is an integer equal to or greater than 1 and equal to or smaller than n−1; and (2) when the charge voltage per one battery reaches the voltage $Ec(k)$, charging the secondary batteries at a current $Ic(k+1)$ smaller than the current $Ic(k)$ until the charge voltage per one battery reaches a voltage $Ec(k+1)$ higher than the voltage $Ec(k)$, in which (3) the currents $Ic(k)$ and $Ic(k+1)$ are set according to frequency of use or number of charge and discharge cycles of the secondary batteries.

18 Claims, 6 Drawing Sheets

(51) Int. Cl.
*H01M 10/0525* (2010.01)
*H01M 10/44* (2006.01)

(56) References Cited

U.S. PATENT DOCUMENTS

| | | |
|---|---|---|
| 2011/0316487 A1 | 12/2011 | Nakai et al. |
| 2012/0133338 A1 | 5/2012 | Suzuki et al. |

FOREIGN PATENT DOCUMENTS

| | | |
|---|---|---|
| JP | 2005-151683 A | 6/2005 |
| JP | 2010-021132 A | 1/2010 |
| WO | 2009-150773 A1 | 12/2009 |
| WO | 2011-033700 A1 | 3/2011 |
| WO | 2011-065009 A1 | 6/2011 |
| WO | 2011-074199 A1 | 6/2011 |

* cited by examiner

| Range(m) of Nc | Correction amount at $k^{th}$ step: $\Delta Ic(m,k)$ | | | |
|---|---|---|---|---|
| | k=1 | k=2 | ... | k=n |
| Range(1): Nc1 to Nc2 | $\Delta Ic(1,1)$ | $\Delta Ic(1,2)$ | ... | $\Delta Ic(1,n)$ |
| Range(2): Nc2 to Nc3 | $\Delta Ic(2,1)$ | $\Delta Ic(2,2)$ | ... | $\Delta Ic(2,n)$ |
| Range(3): Nc3 to Nc4 | $\Delta Ic(3,1)$ | $\Delta Ic(3,2)$ | ... | $\Delta Ic(3,n)$ |
| ... | ... | ... | ... | |

CHARGING METHOD FOR NON-AQUEOUS ELECTROLYTE SECONDARY BATTERY, AND BATTERY PACK

RELATED APPLICATIONS

This application is the U.S. National Phase under 35 U.S.C. §371 of International Application No. PCT/JP2012/001121, filed on Feb. 20, 2012, which in turn claims the benefit of Japanese Application No. 2011-060216, filed on Mar. 18, 2011, the disclosures of which Applications are incorporated by reference herein.

TECHNICAL FIELD

The present invention relates to a technique for shortening the charging time of a non-aqueous electrolyte secondary battery while suppressing deterioration thereof.

BACKGROUND ART

Lithium ion secondary batteries with high voltage and high energy density have been widely used as power sources for electronic devices such as notebook personal computers, cellular phones, and audio-visual (AV) devices. Lithium ion secondary batteries are one of non-aqueous electrolyte secondary batteries using a non-aqueous electrolytic solution as electrolyte. Lithium ion secondary batteries typically use a carbon material capable of absorbing and desorbing lithium as a negative electrode active material, and a lithium-containing composite oxide (e.g., $LiCoO_2$) as a positive electrode active material.

In recent years, as electronic devices have been smaller in size and higher in performance, there has been increasing demand for higher capacity and longer life of lithium ion secondary batteries. In addition, as electronic devices have been more frequently used in association with the advance of ubiquitous society, there also has been increasing demand for shorter charging time.

In order to achieve a higher capacity of secondary batteries, increasing the packing density of active material is generally regarded as effective. In lithium ion secondary batteries, however, if the packing density of active material is increased, lithium ion-acceptability of the active material tends to degrade during charging. As a result, the charge and discharge cycle life characteristics (hereinafter simply referred to as "cycle characteristics") may deteriorate.

Meanwhile, in order to achieve a longer life of non-aqueous electrolyte secondary batteries, i.e., to improve the cycle characteristics, decreasing the charge current has been proposed. By decreasing the charge current, deterioration in cycle characteristics can be prevented even when the active material is packed at a high density.

Furthermore, a high upper limit of charge voltage facilitates the decomposition of non-aqueous electrolyte, which leads to deterioration in cycle characteristics. Therefore, by lowering the upper limit of charge voltage, deterioration in cycle characteristics can be prevented.

However, if the charge current is decreased, the quantity of electricity that can be charged to secondary batteries per unit time is reduced, which inevitably results in a longer charging time. With regard to the charging time of secondary batteries, a shorter charging time has been demanded in various fields. Merely decreasing the charge current fails to satisfy the demand. On the other hand, lowering the upper limit of charge voltage results in reduced discharge capacity, and consequently, the length of time for which the device can be used on one charge is reduced.

Under these circumstances, various charging methods have been conventionally proposed in order to shorten the charging time of secondary batteries without deteriorating the cycle characteristics thereof.

For example, Patent Literature 1 proposes that when charging a battery by a constant-current charging method in which charging is performed at a constant current, the current be changed stepwise. Specifically, the battery is charged first at a large constant current until the battery voltage reaches a predetermined cut-off voltage (end-of-charge voltage). When the battery voltage reaches a predetermined cut-off voltage, the charge current is decreased so that the battery voltage is decreased temporarily. Subsequently, the battery is charged at a constant current smaller than the initial current value until the battery voltage reaches the predetermined cut-off voltage. In this manner, the battery is constant-current charged at a current value in multiple steps, while the current value is sequentially switched to a smaller value. In the charging method of Patent Literature 1, the cut-off voltage (end-of-charge voltage) is changed at each step of the constant-current charging, according to the amount of voltage drop due to internal resistance of the battery.

Patent Literature 2 also proposes that when charging a battery by a constant-current charging method in which charging is performed at a constant current, the current be changed stepwise. Specifically, in the charging method of Patent Literature 2, the battery is charged at a comparatively large first current until the charge voltage reaches a first upper limit voltage of 3.8 to 4.0 V which is lower than an end-of-charge voltage. Subsequently, the battery is charged at a second current smaller than the first current until the charge voltage reaches a second upper limit voltage which is higher than the first upper limit voltage (and equal to or lower than the end-of-charge voltage). The procedures above are repeated, to charge the battery to the end-of-charge voltage.

CITATION LIST

Patent Literature

[PTL 1] Japanese Laid-Open Patent Publication No. Hei 10-145979
[PTL 2] Japanese Laid-Open Patent Publication No. 2010-21132

SUMMARY OF INVENTION

Technical Problem

As mentioned above, in Patent Literature 1, the cut-off voltage (end-of-charge voltage) is switched at each step of the constant-current charging. Specifically, the internal resistance of the battery is calculated, and the voltage value equal to the amount of voltage drop corresponding to the calculated internal resistance is added to the initial cut-off voltage (end-of-charge voltage), according to which the cut-off voltage is switched. In switching the cut-off voltage as proposed by Patent Literature 1, however, the cut-off voltage may be set too high when the internal resistance of the battery is increased. If this happens, the secondary battery is overcharged, and the cycle characteristics thereof deteriorate.

On the other hand, in Patent Literature 2, when the battery is in the early stage where the number of charge/discharge cycles is small, a shorter charging time can be achieved while the deterioration of the battery is suppressed. The internal resistance of secondary batteries tends to increase as the number of charge/discharge cycles increases. Therefore, the lithium-ion acceptability at the negative electrode may degrade rapidly as the number of charge/discharge cycles increases, causing the cycle characteristics to deteriorate. For this reason, merely by switching the charge current stepwise in the constant-current charging as proposed by Patent Literature 2 may fail to sufficiently suppress the deterioration in cycle characteristics. Moreover, in Patent Literature 2, as in Patent Literature 1, switching the charge current is followed by a sharp decrease in the charge voltage. This can be an obstacle to shortening the charging time.

In view of the above, the present invention intends to provide a charging method for one or more non-aqueous electrolyte secondary batteries and a battery pack that enable the charging time to be shortened, while suppressing the deterioration in the cycle characteristics of the non-aqueous electrolyte secondary battery.

Solution to Problem

One aspect of the present invention relates to a charging method for one or more non-aqueous electrolyte secondary batteries. The method includes n steps of constant-current charging processes, where n is an integer equal to or greater than 2. The n steps include:

(1) charging the one or more secondary batteries at a current $Ic(k)$ until a charge voltage per one battery reaches a voltage $Ec(k)$, where k is an integer equal to or greater than 1 and equal to or smaller than n−1;

(2) when the charge voltage per one battery reaches the voltage $Ec(k)$, charging the one or more secondary batteries at a current $Ic(k+1)$ smaller than the current $Ic(k)$ until the charge voltage per one battery reaches a voltage $Ec(k+1)$ higher than the voltage $Ec(k)$, and (3) setting the current $Ic(k)$ and the current $Ic(k+1)$ according to frequency of use or number of charge and discharge cycles of the one or more secondary batteries.

Another aspect of the present invention relates to a battery pack including one or more non-aqueous electrolyte secondary batteries, a charge circuit configured to charge the secondary batteries with electric power from an outer power source, and a controller configured to control the charge circuit.

The controller controls the charge circuit such that the one or more secondary batteries are charged by n steps constant-current charging processes, where n is an integer equal to or greater than 2. In the n steps, (1) the one or more secondary batteries are charged at a current $Ic(k)$ until a charge voltage per one battery reaches a voltage $Ec(k)$, where k is an integer equal to or greater than 1 and equal to or smaller than n−1, (2) when the charge voltage per one battery reaches the voltage $Ec(k)$, the one or more secondary batteries are charged at a current $Ic(k+1)$ smaller than the current $Ic(k)$ until the charge voltage per one battery reaches a voltage $Ec(k+1)$ higher than the voltage $Ec(k)$, and (3) the controller sets the current $Ic(k)$ and the current $Ic(k+1)$ according to frequency of use or number of charge and discharge cycles of the one or more secondary batteries.

Advantageous Effects of Invention

According to the present invention, it is possible to shorten the charging time of a non-aqueous electrolyte secondary battery while suppressing deterioration in cycle characteristics thereof.

While the novel features of the invention are set forth particularly in the appended claims, the invention, both as to organization and content, will be better understood and appreciated, along with other objects and features thereof, from the following detailed description taken in conjunction with the drawings.

DESCRIPTION OF EMBODIMENTS

One aspect of the present invention relates to a method of charging one or more non-aqueous electrolyte secondary batteries by n steps of constant-current charging processes, where n is an integer equal to or greater than 2. In the n steps of constant-current charging processes, (1) one or more secondary batteries are charged at a current $Ic(k)$ until the charge voltage per one battery reaches a voltage $Ec(k)$, where k is an integer equal to or greater than 1 and equal to or smaller than n−1; and (2) when the charge voltage per one battery reaches the voltage $Ec(k)$, the one or more secondary batteries are charged at a current $Ic(k+1)$ smaller than the current $Ic(k)$ until the charge voltage per one battery reaches a voltage $Ec(k+1)$ higher than the voltage $Ec(k)$. The current $Ic(k)$ and the current $Ic(k+1)$ are set according to the frequency of use or the number of charge and discharge cycles of the one or more secondary batteries.

According to the above charging method, high-rate charge is performed in a low-voltage area in the early stage of charging, and low-rate charge is performed in a high-voltage area in the last stage of charging. Moreover, according to the above charging method, the charge current is set according to the frequency of use or the number of charge/discharge cycles of the secondary batteries. As described in detail hereinafter, this enables the charge current to be set appropriately in response to an increase in the internal resistance of the secondary batteries associated with increase in the frequency of use. As a result, the charging time can be shortened, and the deterioration in cycle characteristics due to degradation in lithium-ion acceptability at the negative electrode can be suppressed. Here, the number n of steps is preferably 2 to 10, and particularly preferably 2 or 3.

According to one embodiment of the present invention, in the above charging method, after the charge voltage per one battery reaches the voltage $Ec(k)$, the one or more secondary batteries are charged at the voltage $Ec(k)$ until the charge current decreases to the current $Ic(k+1)$. After the charge voltage per one battery reaches the voltage $Ec(k+1)$, the one or more secondary batteries are charged at the voltage $Ec(k+1)$ until the charge current decreases to a current $Ic(k+2)$.

Specifically, in this embodiment, in charging a non-aqueous electrolyte secondary battery (hereinafter sometimes simply referred to as a "battery"), a constant-current charging and a constant-voltage charging are alternately repeated in multiple steps, until the battery is fully charged, for example. Here, when the current (value) for constant-current charging at the $1^{st}$ step is denoted as $Ic(1)$, the current (value) for constant-current charging at the $2^{nd}$ step is set smaller than the current $Ic(1)$. In such a manner, the charge current for constant-current charging at each step is decreased as the charging proceeds.

The upper limit voltage (first upper-limit voltage) for constant-current charging at the $1^{st}$ step is set to a voltage $Ec(1)$ which is lower than an end-of-charge voltage corresponding to the rated capacity of the battery. When the battery voltage reaches the voltage $Ec(1)$ by the $1^{st}$ constant-current charging, the $1^{st}$ constant-current charging is complete. Subsequently, a constant-voltage charging at the $1^{st}$ step in which the battery is charged at a constant voltage being $Ec(1)$ is started. When the charge current is decreased by the $1^{st}$ constant-voltage charging from the current $Ic(1)$ to a current $Ic(2)$ being a first lower-limit current, where $Ic(2)<Ic(1)$, the $1^{st}$ constant-voltage charging is complete.

Next, a constant-current charging at the current $Ic(2)$ at the $2^{nd}$ step is started. When the battery voltage is increased by the $2^{nd}$ constant-current charging to a voltage $Ec(2)$ being a second upper-limit voltage, where $Ec(2)>Ec(1)$, the $2^{nd}$ constant-current charging is complete. Subsequently, a constant-voltage charging at the $2^{nd}$ step in which the battery is charged at a constant voltage being $Ec(2)$ is started. When the charge current is decreased by the $2^{nd}$ constant-voltage charging from the current $Ic(2)$ to a current $Ic(3)$ being a second lower-limit current, where $Ic(3)<Ic(2)$, the $2^{nd}$ constant-voltage charging is complete.

In the manner as described above, according to the present invention, the battery is charged basically by performing constant-current charging and constant-voltage charging in multiple steps. In this case, the upper limit voltage for constant-current charging at each step is raised stepwise until it becomes equal to the end-of-charge voltage corresponding to the rated capacity of the battery. The higher the upper limit voltage for constant-current charging is, the lower the charge current therefor (currents $Ic(k)$ and $Ic(k+1)$) is to be set.

As a result, high-rate charge is performed in a low-voltage area in the early stage of charging, and low-rate charge is performed in a high-voltage area in the last stage of charging. Consequently, the charging time can be shortened, and the deterioration in cycle characteristics due to degradation in lithium-ion acceptability at the negative electrode can be suppressed.

The cycle characteristics herein refer to a relationship between the number of cycles and the discharge capacity when a secondary battery is repetitively charged and discharged within a predetermined voltage range and under predetermined conditions. The number of cycles at which the discharge capacity is reduced from the initial capacity by a predetermined ratio is referred to as a cycle life of the secondary battery, or sometimes simply referred to as a life. Reduction in life of the secondary battery is referred to as deterioration in cycle characteristics.

Figure 5:
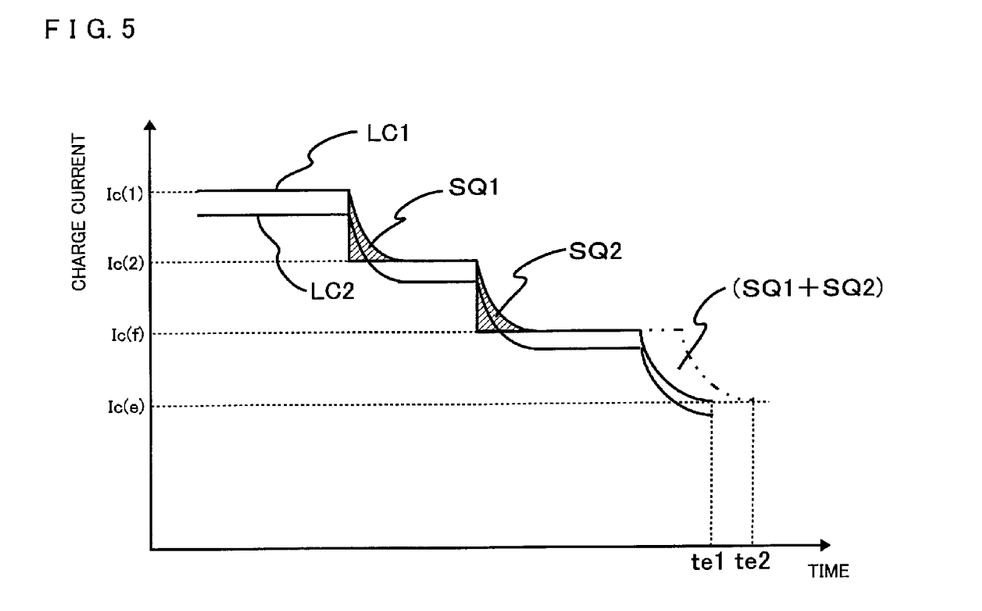
FIG. 5 A graph showing the results of the charge process

In this embodiment, in switching the charge current, the charge current is not decreased immediately, but decreased gradually through a constant-voltage charging (see FIG. 5). By switching in this manner, the average charge current becomes high, as compared with by decreasing the charge current immediately. Therefore, the charging time can be further shortened.

Furthermore, in the present invention, the currents $Ic(k)$ and $Ic(k+1)$ for constant-current charging at the $k^{th}$ and $(k+1)^{th}$ steps are set according to the frequency of use or the number of charge/discharge cycles of the battery. Generally, the internal resistance of secondary batteries increases with increase in the number of charge/discharge cycles. When the internal resistance is increased, in order to perform high-rate charging, the charge voltage must be raised higher than before. This may in turn cause the battery cycle characteristics to deteriorate and the internal resistance to increase, falling in a vicious cycle. Therefore, setting the currents $Ic(k)$ and $Ic(k+1)$ as above according to the frequency of use or the number of charge/discharge cycles of the battery makes it possible to set the charge current appropriately, with an increase in internal resistance being taken into account and without accompanied by deterioration in cycle characteristics. The lithium-ion acceptability at the negative electrode is consequently unlikely to degrade during high-rate charging. Therefore, a shorter charging time and improved cycle characteristics can be realized at the same time.

The setting of the currents $Ic(k)$ and $Ic(k+1)$ according to the frequency of use or the number of charge/discharge cycles of the battery may be done such that the currents $Ic(k)$ and $Ic(k+1)$ are decreased every time when the number of charge/discharge cycles is increased by a certain number. Specifically, the currents $Ic(k)$ and $Ic(k+1)$ are decreased every time when the number of charge/discharge cycles is increased by "one", or alternatively, the currents $Ic(k)$ and $Ic(k+1)$ are decreased every time when the number of charge/discharge cycles is increased by "two". Although the certain number is not particularly limited, the smaller it is, the more preferable for precise control of the charge current. The certain number is particularly preferably "one".

In this case, the currents $Ic(k)$ and $Ic(k+1)$ are preferably decreased at a common rate $\alpha$ every time when the frequency of use or the number of charge/discharge cycles of the secondary battery is increased by a certain number, and the rate $\alpha$ is preferably decreased gradually as the frequency of use or the number of charge/discharge cycles increases. The rate of increase in the internal resistance of non-aqueous electrolyte secondary batteries associated with increase in the number of charge/discharge cycles is high at the beginning of use of batteries, during which the number of charge/discharge cycles is comparatively small, and thereafter, the rate drops gradually. It is therefore reasonable to set the rate $\alpha$ at which the currents $Ic(k)$ and $Ic(k+1)$ are decreased, such that it is comparatively high at the beginning of use of the battery, and then decreased gradually as the frequency of use or the number of charge/discharge cycles is increased. By setting as above the rate $\alpha$ at which the currents $Ic(k)$ and $Ic(k+1)$ are decreased, a shorter charging time and improved cycle characteristics can be more effectively achieved.

Furthermore, in one possible embodiment of the present invention, the currents $Ic(k)$ and $Ic(k+1)$ are decreased only once, for example, when the number of charge/discharge cycles is increased by a certain number. The rate of increase in the internal resistance is high at the beginning of use of the battery, and thereafter, the rate of increase in the internal resistance becomes smaller. As such, even in the case where the currents $Ic(k)$ and $Ic(k+1)$ are decreased only once by an appropriate vale while the frequency of use is comparatively low, the cycle characteristics can be expected to be effectively improved sufficiently. The certain number of charge/discharge cycles in this case is preferably within the range of, for example, 50 to 100 cycles, although it depends on the configuration (e.g., the type of positive electrode material, and the packing density) of the battery. This is because, in general, after the number of charge/discharge cycles reaches the number within the above range, the rate of increase in the internal resistance thereafter is quite low until the battery is completely deteriorated.

On the other hand, the ratio Ic(k+1)/Ic(k) of the current Ic(k+1) to the current Ic(k) is preferably equal to or greater than 0.1 and equal to or smaller than 0.75. By setting the ratio Ic(k+1)/Ic(k) to be equal to or greater than 0.1, the charging time can be effectively shortened. By setting the ratio Ic(k+1)/Ic(k) to be equal to or smaller than 0.75, the influence of the deterioration in cycle characteristics can be reduced.

Here, the non-aqueous electrolyte secondary battery includes a positive electrode, a negative electrode, and a non-aqueous electrolyte. The positive electrode preferably includes a lithium nickel oxide-based lithium-containing composite oxide represented by the general formula (1): $LiNi_xCo_yM_{1-x-y}O_2$, where M is at least one element selected from the group consisting of group 2 elements, group 3 elements, group 4 elements, group 7 elements, and group 13 elements in the long form of the periodic table, $0.3 \leq x < 1$, and $0 < y < 0.4$. The larger the x in the general formula (1) is, the more the positive electrode material is like lithium nickel oxide ($LiNiO_2$).

Here, a lithium ion secondary battery including a lithium nickel oxide-based lithium-containing composite oxide (hereinafter referred to as "Ni-based positive electrode material") as a positive electrode active material is referred to as "Ni-based positive electrode battery", and a lithium ion secondary battery including a lithium cobalt oxide-based lithium-containing composite oxide (hereinafter referred to as "Co-based positive electrode material") as a positive electrode active material is referred to as "Co-based positive electrode battery". It is easier to shorten the charging time in constant-current and constant-voltage charging of the former than that of the latter.

This is because, given that the depths of charge are the same, the potential of the Ni-based positive electrode material is lower than that of the Co-based positive electrode material. In other words, the profile of the charge voltage of the Ni-based positive electrode battery is lower than that of the Co-based positive electrode battery. Accordingly, even if batteries of the same capacity are charged at the same current, the length of time until the battery voltage reaches the upper limit voltage is longer in the case of the Ni-based positive electrode battery, than in the case of the Co-based positive electrode battery. This means that, in the Ni-based positive electrode battery, the proportion of constant-current charging can be set larger, when the same quantity of electricity is to be charged to those batteries by one set of constant-current charging and constant-voltage charging.

When constant-current charging is compared with constant-voltage charging, the charge rate (the quantity of electricity charged to a battery per unit time) by constant-current charging is higher. Therefore, increasing the proportion of constant-current charging can shorten the charging time for one set of charging. For the foregoing reason, by using a material represented by the general formula (1) for the positive electrode, the charging time can be shortened remarkably.

Moreover, for the foregoing reason, by using a material represented by the general formula (1) for the positive electrode, even with a smaller charge current, charging procedure can be completed in almost the same length of time as that of the Co-based positive electrode battery. As a result, if the charging time of the Ni-based positive electrode battery is set equal to that of the Co-based positive electrode battery, the charge current in the constant-current charging for the Ni-based positive electrode battery can be set smaller than that for the Co-based positive electrode battery. In other words, in the Ni-based positive electrode battery, the effect of improving the cycle characteristics can be increased more greatly, by making the effect of shortening the charging time obtained by the present invention on almost the same level as that obtained with the Co-based positive electrode battery. Therefore, by using a material represented by the general formula (1) for the positive electrode, the charging time can be easily shortened, while the deterioration in cycle characteristics is suppressed.

When k is one, the current Ic(k) is preferably equal to or above 0.7 It and equal to or below 2 It, and the voltage Ec(k) is preferably equal to or above 3.8 V and equal to or below 4 V. Here, in the case where the battery to be charged is a battery pack, the voltage Ec(1) being the upper limit voltage is set equal to or above 3.8 V and equal to or below 4 V, per each battery constituting the battery pack. On the other hand, with regard to the charge current, in the case where the battery to be charged is a battery pack, not the charge current through each battery but the charge current through the battery pack as a whole is set to the current Ic(k) equal to or above 0.7 It and equal to or below 2 It. When the upper limit voltage (voltage Ec(1)) for constant-current charging at the $1^{st}$ step (i.e., n=1), which is a high-rate charging, is above 4 V, the lithium-ion acceptability at the negative electrode during charging degrades, and the cycle life is reduced. When the voltage Ec(1) is below 3.8 V, the proportion of the $1^{st}$ constant-current charging, which is a high-rate charging, to the whole charging (the proportion in terms of the quantity of electricity charged) is reduced, resulting in a longer charging time. Therefore, in order to achieve more excellent cycle life characteristics and a shorter charging time, the voltage Ec(1) is preferably equal to or above 3.8 V and equal to or below 4 V.

On the other hand, when the charge current (current Ic(1)) for constant-current charging at the $1^{st}$ step is below 0.7 It, the charging time is prolonged. When the current Ic(1) is above 2 It, the lithium-ion acceptability at the negative electrode during charging tends to degrade, and the cycle life characteristics are likely to deteriorate. Therefore, in order to achieve more excellent cycle life characteristics and a shorter charging time, the current Ic(1) is preferably equal to or above 0.7 It and equal to or below 2 It. Here, if the battery voltage is equal to or above the voltage Ec(1) at the time of start of charging, charging is started from the $2^{nd}$ constant-current charging.

Here, "It" is a symbol for the charge current or discharge current expressed in relation with the battery rated capacity, and is defined by the formula: It(A)=Rated capacity (Ah)/X (h), where "X" is a length of time in which a quantity of electricity corresponding to the rated capacity can be charged or discharged. For example, 0.5 It means that the charge current or discharge current is equal to "rated capacity (Ah)/2(h)".

When the number of total steps executing the constant-current charging and the subsequent constant-voltage charging is "f", the current Ic(f) is preferably equal to or above 0.3 It and equal to or below 0.7 It, and the voltage Ec(f) is preferably above 4 V and equal to or below 4.4 V. In this case, the voltage Ec(f) is equal to an end-of-charge voltage, which is defined by the rated capacity of the battery. When the end-of-charge voltage is above 4.4 V, side reactions such as decomposition reaction of non-aqueous electrolyte occur, and the cycle life characteristics tend to deteriorate. When the end-of-charge voltage is below 4.4 V, the rated capacity is reduced, and the length of time for which the device can be used on one charge is reduced. Therefore, the voltage Ec(f) is preferably above 4 V and equal to or below 4.4 V.

Increasing the charge current when the depth of charge is high tends to degrade the lithium-ion acceptability at the negative electrode during charging. Therefore, by setting the charge current (current Ic(f)) for constant-current charging at the final step to be somewhat small, i.e., equal to or above 0.3 It and equal to or below 0.7 It, more excellent cycle life characteristics and a shorter charging time can be achieved at the same time.

Another aspect of the present invention relates to a battery pack including one or more non-aqueous electrolyte secondary batteries, a charge circuit configured to charge the secondary batteries with electric power from an outer power source, and a controller configured to control the charge circuit. The controller controls the charge circuit such that the one or more secondary batteries are charged by n steps of constant-current charging processes. The n steps include: (1) charging the one or more secondary batteries at a current Ic(k) until a charge voltage per one battery reaches a voltage Ec(k), where k is an integer equal to or greater than 1 and equal to or smaller than n−1 where n≥2; and (2) when the charge voltage per one battery reaches the voltage Ec(k), charging the one or more secondary batteries at a current Ic(k+1) smaller than the current Ic(k) until the charge voltage per one battery reaches a voltage Ec(k+1) higher than the voltage Ec(k). The controller sets the current Ic(k) and the current Ic(k+1), according to the frequency of use or the number of charge and discharge cycles of the one or more secondary batteries.

An embodiment of the present invention is described below with reference to the drawings appended hereto.
(Embodiment 1)

Figure 1:
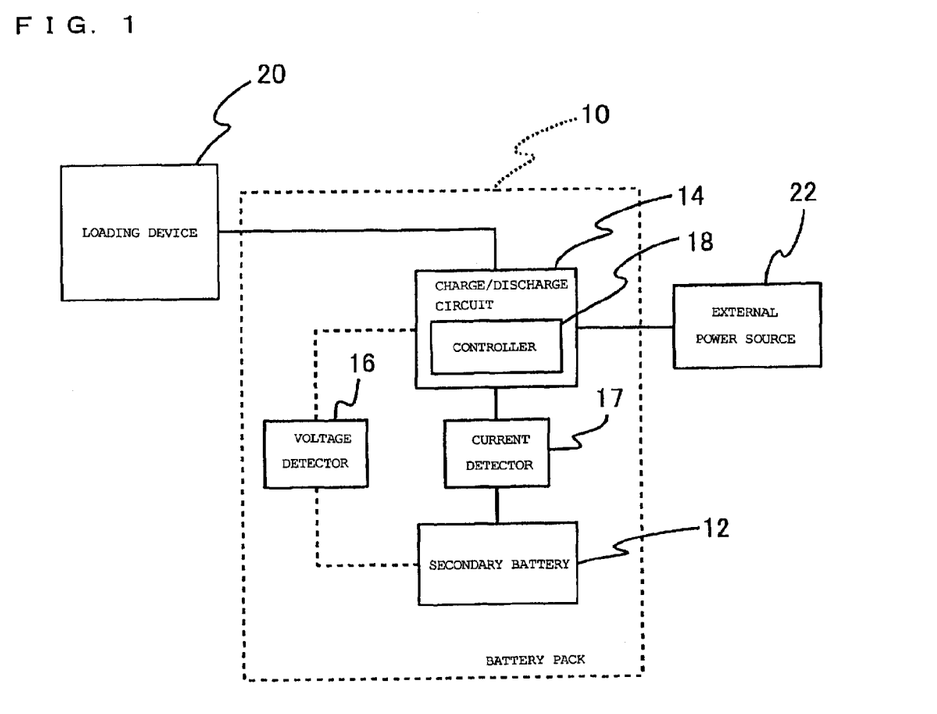
FIG. 1 A function block diagram of a battery pack to which a charging method for one or more lithium ion secondary batteries according to one embodiment of the present invention is applied FIG. 2 A vertical cross-sectional view of an example of a lithium ion secondary battery included in the battery pack of FIG. 1

FIG. 1 is a function block diagram of a battery pack to which a charging method for one or more lithium ion secondary batteries according to one embodiment of the present invention is applied.

A battery pack 10 includes a secondary battery 12 including a non-aqueous electrolyte secondary battery (e.g., a lithium ion secondary battery), a charge/discharge circuit 14, a voltage detector (or voltage sensor) 16 for detecting a voltage across the secondary battery 12, and a current detector (or current sensor) 17 for detecting a current through the secondary battery 12. The battery pack 10 is connectable to a loading device 20 and an external power source 22.

The charge/discharge circuit 14 includes a controller 18. The secondary battery 12 in the battery pack 10 may be one non-aqueous electrolyte secondary battery, or include two or more non-aqueous electrolyte secondary batteries connected in parallel and/or series. The controller 18 may be provided separately from the charge/discharge circuit 14. Some of the functions of the controller 18 described hereinafter may be incorporated in the loading device 20, or in other units such as a charger for charging the battery pack 10.

The loading device 20 is connected to the secondary battery 12 via the charge/discharge circuit 14. The secondary battery 12 is connected to the external power source 22, such as a commercial power source, via the charge/discharge circuit 14. The voltage detector 16 detects the open circuit voltage (OCV) and the closed circuit voltage (CCV) of the secondary battery 12, and sends the voltage values detected by the detector to the controller 18.

The controller 18 controls the charge and discharge of the secondary battery 12 to be basically performed within a predetermined voltage region. Such a controller may be configured of, for example, a central processing unit (CPU), a microcomputer, a micro processing unit (MPU), a main memory, and an auxiliary memory.

The auxiliary memory (e.g., nonvolatile memory), stores information regarding, for example, the end-of-charge voltage of the secondary battery 12, the upper limit voltage of the constant-current charging processes (or the charge voltage for constant-voltage charging), the charge current (or the lower limit current for constant-voltage charging), the end-of-discharge voltage, and the correction amount when correcting the charge current (or lower limit current) according to the frequency of use or the number of charge/discharge cycles of the secondary battery (e.g., a charge current correction table).

Figure 2:
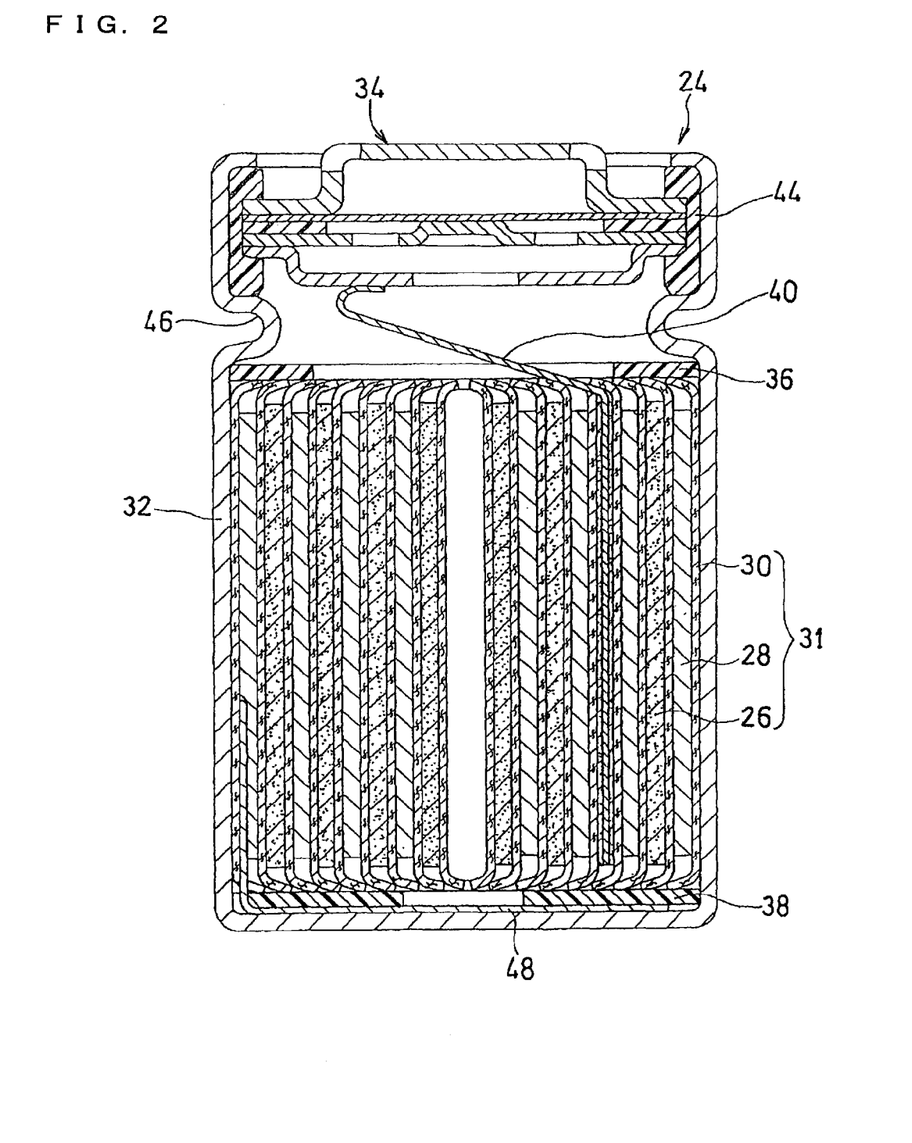

Next, a non-aqueous electrolyte secondary battery used as the secondary battery 12 is described with reference to FIG. 2. FIG. 2 is a cross-sectional view illustrating an internal structure of a lithium ion secondary battery as one example of the non-aqueous electrolyte secondary battery. Here, a lithium ion secondary battery 24 shown in the figure is cylindrical, but the present invention is not limited thereto, and is applicable to lithium ion secondary batteries of various shapes, such as prismatic, flat, or pin-shaped lithium ion secondary batteries.

The lithium ion secondary battery 24 includes an electrode group 31 formed by spirally winding a positive electrode 26, a negative electrode 28, and a separator 30 interposed therebetween. The electrode group 31 is accommodated together with a non-aqueous electrolyte (not shown) in a bottomed cylindrical battery case 32 made of metal and having an opening. In the interior of the battery case 32, an upper insulating plate 36 and a lower insulating plate 38 are provided on the top and the bottom of the electrode group 31, respectively.

The opening of the battery case 32 is sealed with a sealing plate assembly 34, by which the electrode group 31 and the non-aqueous electrolyte are hermetically enclosed within the battery case 32. The sealing plate assembly 34 is supported on a small diameter portion 46 formed in the upper portion of the battery case 32, while being electrically insulated from the battery case 32 by a gasket 44 as an insulator. In this state, the opening end of the battery case 32 is crimped so that the peripheral portion of the sealing plate assembly 34 is sandwiched between the small diameter portion 46 and the opening end, with the gasket 44 interposed therebetween. The sealing plate assembly 34 is thus mounted at the opening of the battery case 32.

The sealing plate assembly 34 is connected to the positive electrode 26 via a positive electrode lead 40. This allows the sealing plate assembly 34 to function as an outer terminal of the positive electrode 26. On the other hand, the negative electrode 28 is connected to the battery case 32 via a negative electrode lead 48. This allows the battery case 32 to function as an outer terminal of the negative electrode 28.

The positive electrode includes, for example, a positive electrode current collector, and a positive electrode active material layer formed on the positive electrode current collector. The positive electrode active material layer is made of a mixture of, for example, a positive electrode active material, an electrically conductive material and a binder.

The positive electrode active material is preferably a Ni-based positive electrode material represented by the general formula (1): $LiNi_xCo_yM_{1-x-y}O_2$, where M is at least one element selected from the group consisting of group 2 elements, group 3 elements, group 4 elements, group 7 elements, and group 13 elements in the long form of the periodic table, $0.3 \leq x < 1$, and $0 < y < 0.4$.

Inclusion of a Ni-based positive electrode material in the positive electrode can more effectively shorten the charging time and improve the cycle characteristics as described above. Such a Ni-based positive electrode material can be produced by a publicly known method. Here, setting x to 0.3 or more makes the effect of reducing the charge voltage remarkable. Setting y to below 0.4 makes the reduction effect of charge voltage more remarkable. More preferably, x satisfies $0.6 \leq x \leq 0.9$, y satisfies $0.05 \leq y \leq 0.2$.

Addition of element M of the general formula (1) to the positive electrode active material improves the cycle life characteristics of the lithium ion secondary battery, and allows for easy achievement of a higher capacity. Examples of the Group 2 elements include Mg and Ca. Examples of the Group 3 elements include Sc and Y. Examples of the Group 4 elements include Ti and Zr. Examples of the Group 7 elements include Mn. Examples of the Group 13 elements include B and Al. Most preferable among them are Mn and Al because they have a highly stable crystal structure and the safety can be ensured.

The conductive material may be a carbon material such as natural graphite, artificial graphite, carbon black or acetylene black. The binder may be polyvinylidene fluoride (PVDF) or polytetrafluoroethylene (PTFE). The positive electrode current collector may be a metal foil such as aluminum foil. The positive electrode can be obtained by dispersing a mixture of positive electrode active material, conductive material and binder in a dispersion medium such as N-methyl-2-pyrrolidone, to prepare a positive electrode paste, and applying the paste onto the positive electrode current collector, followed by drying.

The negative electrode 28 also, like the positive electrode 26, includes a negative electrode current collector and a negative electrode active material layer formed on the negative electrode current collector. The negative electrode active material layer may be a deposition film formed by a method such as vapor deposition, or made of a mixture of negative electrode active material, electrically conductive material and binder. The negative electrode active material may be a carbon material capable of absorbing and releasing lithium, such as artificial graphite or natural graphite. Alternatively, the negative electrode active material may be a silicon alloy or a silicon oxide. The negative electrode current collector may be a metal foil such as nickel foil or copper foil. Examples of the conductive material and the binder are the same as those for the positive electrode. The negative electrode can be obtained by dispersing a mixture of negative electrode active material, conductive material and binder in a dispersion medium such as N-methyl-2-pyrrolidone, to prepare a negative electrode paste, and applying the paste onto the negative electrode current collector, followed by drying.

The non-aqueous electrolyte includes a non-aqueous solvent and a supporting salt dissolved in the non-aqueous solvent. The supporting salt may be a lithium salt such as lithium hexafluorophosphate ($LiPF_6$). The non-aqueous solvent is a mixed solvent of: a cyclic ester, such as ethylene carbonate (EC) or propylene carbonate (PC); and a chain ester, such as dimethyl carbonate (DMC), diethyl carbonate (DEC) or methyl ethyl carbonate (MEC).

Figure 3:
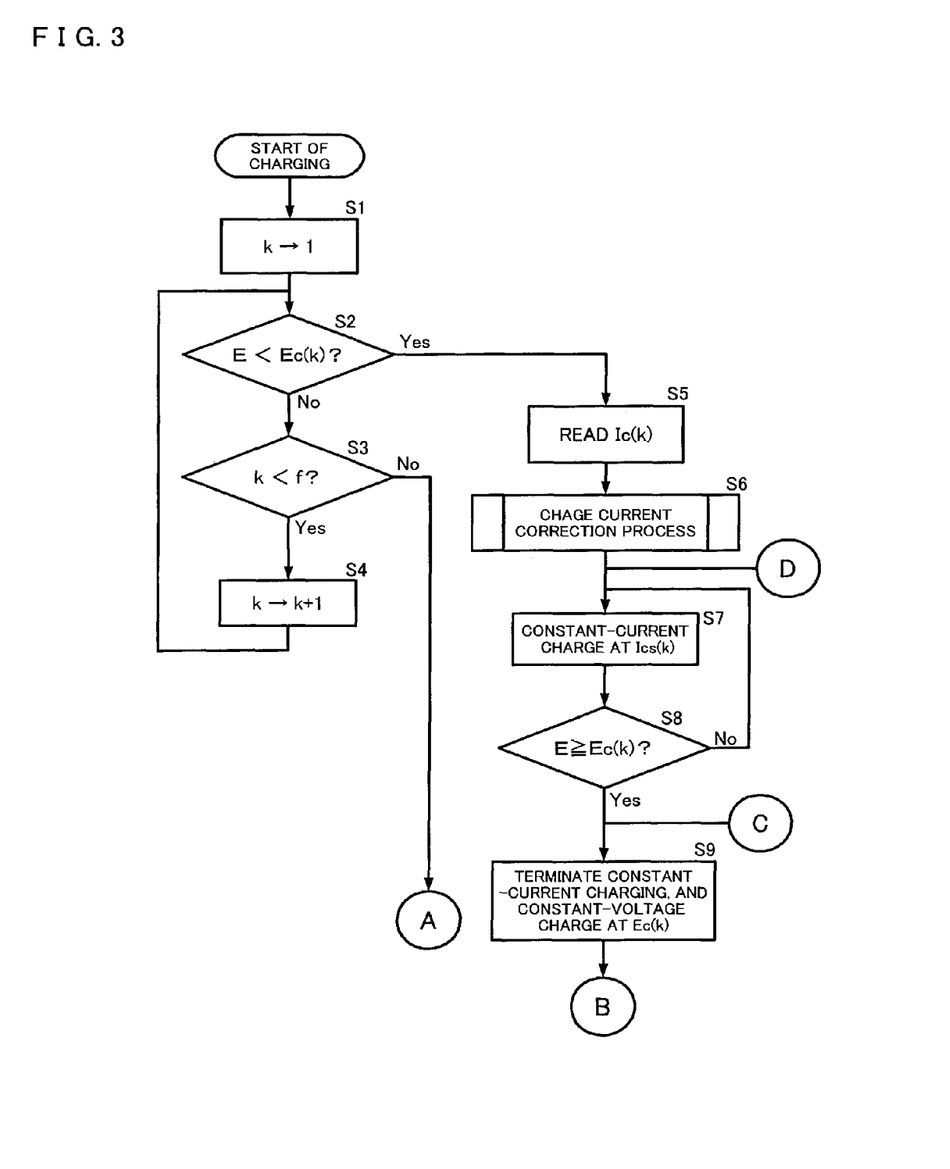
FIG. 3 A flowchart of charge and discharge process
Figure 4:
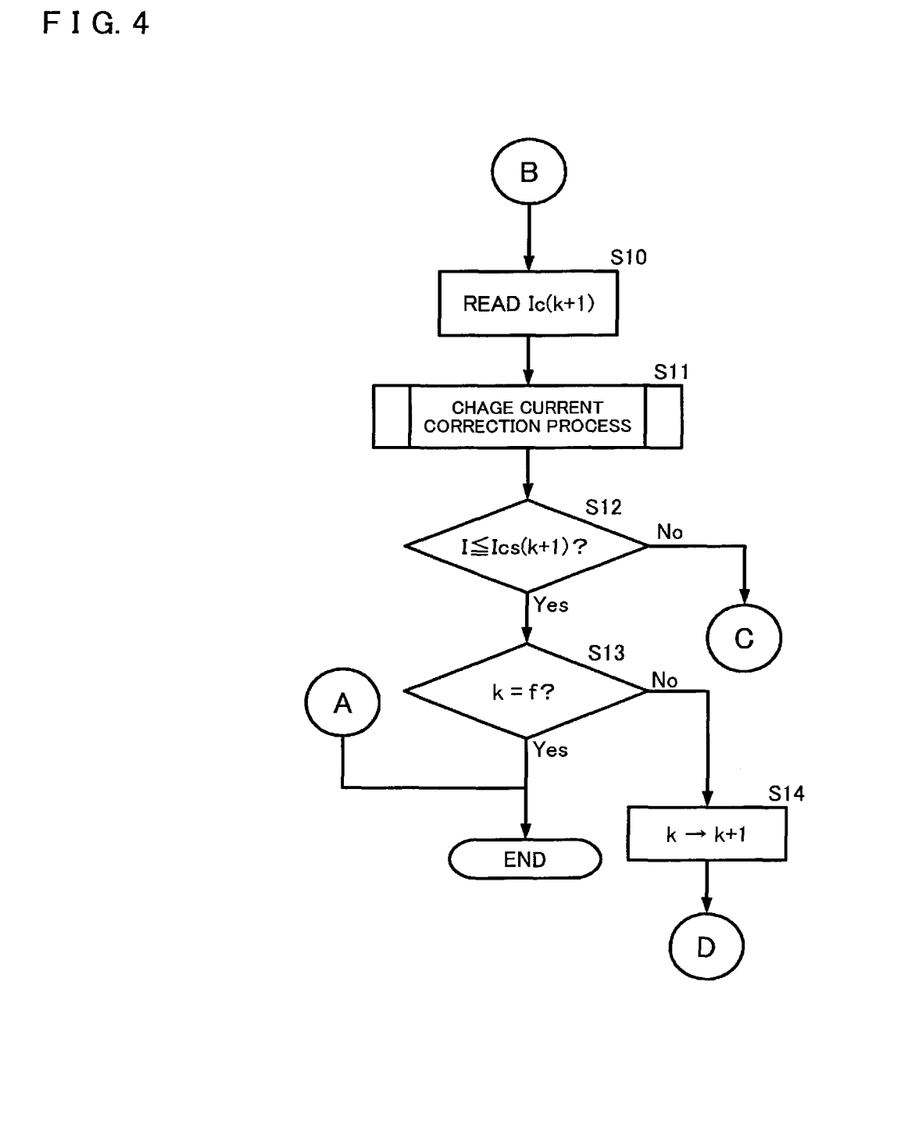
FIG. 4 A flowchart of charge and discharge process

The charging process performed by the controller 18 is described below with reference to FIGS. 3 to 6. FIGS. 3 and 4 are flowcharts showing the process performed by, for example, the CPU of the controller.

In FIG. 3, upon start of the charging process of the secondary battery 12, integer value "1" is substituted for a variable k that is stored in the memory (S1). A voltage E across the secondary battery 12 detected by the voltage detector 16 is compared with a voltage Ec(k) stored in the memory of the controller 18 (S2). First, the battery voltage E is compared with a voltage Ec(1). If the battery voltage E is equal to or above the voltage Ec(k) ("No" in S2), the battery voltage E is regarded as higher than the upper limit voltage for constant-current charging at the $k^{th}$ step (first, the $1^{st}$ step), and subsequently, the variable k is compared with a constant f (S3). Here, the constant f is the number of total charging steps (integer value). As described above, each charging step includes one set of constant-current charging and constant-voltage charging. If the variable k is smaller than the constant f ("Yes" in S3), value "1" is added to the variable k (S4), and the process returns to S2.

If the battery voltage E is below the voltage Ec(k) in S2 ("Yes" in S2), a current Ic(k) stored in the memory of the controller 18 is read (S5). First, Ic(1) is read. Then, a charge-current correction process for setting the charge current based on the current Ic(k), which is read in the previous step, is performed according to the frequency of use or the number of charge/discharge cycles of the battery (S6). This gives a corrected current Ics(k) being a corrected value of the current Ic(k). The charge-current correction process will be described hereinafter in detail. There is a case, however, where the current Ic(k) is not practically corrected, and remains Ic(k)=Ics(k), depending on the frequency of use of the battery. With this regard also, description will be given hereinafter.

Next, the constant-current charging at a corrected current Ics(k) at the $k^{th}$ step is performed (S7). First, charging is performed at Ics(1). Upon passage of a predetermined length of time (e.g., 5 ms) in this state, the battery voltage E is compared again with the voltage Ec(k) (S8). If the battery voltage E is below the voltage Ec(k) ("No" in S8), the process returns to S7. If the battery voltage E is equal to or above the voltage Ec(k) ("Yes" in S8), the battery is regarded as having been charged up to the upper limit voltage, and the constant-current charging is complete. The constant-voltage charging at the voltage Ec(k) is then performed (S9). Upon passage of a predetermined length of time (e.g., 5 ms) in this state, a current Ic(k+1) stored in the memory of the controller 18 is read (S10). First, Ic(2) is read. Then, the charge-current correction process is performed based on the current Ic(k+1) (S11). This gives a corrected current Ics(k+1) being a corrected value of the current Ic(k+1). For the first time, the value obtained here is Ics(2).

Next, a charge current I detected by the current detector 17 is compared with the corrected current Ics(k+1) (S12). First, the charge current I is compared with the corrected current Ics(2). If the charge current I is above the corrected current Ics(k+1) ("No" in S12), the charge current I is regarded as higher than the lower limit current for constant-voltage charging at the $k^{th}$ step (first, the $1^{st}$ step), and the process returns to S9.

If the charge current I is equal to or below the corrected current Ics(k+1) ("Yes" in S12), the charge current I is regarded as having decreased to the lower limit current for constant-voltage charging at the $k^{th}$ step, and subsequently, the variable k is compared with the constant f (S13). If the variable k is equal to the constant f ("Yes" in S13), the charging is regarded as complete, and the process is terminated.

If the variable k is not equal to the constant f ("No" in S13), the charging is regarded as not complete, and value "1" is added to the variable k (S14). The process then returns to S7. Thereafter, S7 to S14 are repeated to perform the charging at the $2^{nd}$ and subsequent steps. The process flow of the $2^{nd}$ charging is briefly described below. The constant-voltage charging at the corrected current Ics(2) of the current Ic(2) is preformed until the battery voltage E reaches the voltage Ec(2) (S7 to S8). When the battery voltage E reaches the voltage Ec(2), the constant-voltage charging at the voltage Ec(2) is preformed until the charge current I decreases to a corrected current Ics(3) of the current Ic(3) (S9 to S12).

When the variable k becomes equal to the constant f by repeating the procedures above, a constant-current charging at the final $f^{th}$ step is performed until the battery voltage E reaches a voltage Ec(f) being the end-of-charge voltage. When the battery voltage E reaches the voltage Ec(f), a constant-voltage charging at the $f^{th}$ step is performed at the voltage Ec(f) until the current Ic decreases to a current Ic(f+1) (corrected current Ics(f+1) thereof) being the end-of-charge current. Here, the current Ic(f+1) can be set to a current value of, for example, 50 to 140 mA.

FIG. 5 is a graph showing an example of the results of the above charge process. Curve LC1 in the figure represents the result of the battery having been subjected to the above process in the early state where the frequency of use is low. Here, the current for constant-current charging is switched in three steps: Ic(1), Ic(2) and Ic(f). This enables high-rate charging in a low-voltage area, and low-rate charging in a high-voltage area. As a result, the charging time can be shortened, while the deterioration of the secondary battery 12 is suppressed. Here, a current Ic(e) (e=f+1) is an end-of-charge current.

For example, in switching the current for constant-current charging from Ic(1) to Ic(2), the current is gradually decreased through constant-voltage charging at the voltage Ec(1). Likewise, the current for constant-current charging is switched from Ic(2) to Ic(f). As compared with when the current is switched immediately, when the charge current is switched by decreasing the current gradually, a quantity of electricity larger by an amount corresponding to the diagonally shaded area (SQ1+SQ2) in FIG. 5 can be charged at the time of switching the charge current.

As a result, the length of time it takes for the charging to be completed can be shortened by a length of time (te2−te1) corresponding to the above-mentioned area (SQ1+SQ2). It is therefore possible to suppress the deterioration of the secondary battery 12, while further shortening the charging time. It is to be noted that the number of steps of the constant-current charging of the present invention is not limited to three as in FIG. 5, and may be any number of steps of two or more.

In FIG. 5, curve LC2 represents the processing result of the battery in the stage where the frequency of use is increased to some extent. Here, the charge current for constant-current charging at each step is set low, and the lower limit current for constant-voltage charging at each step is also set low. In this case also, the charging time can be shortened similarly effectively as shown by curve LC1.

Figure 6:
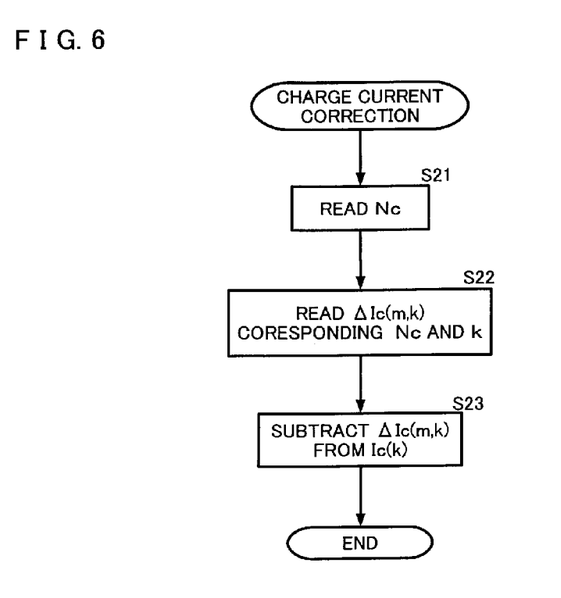
FIG. 6 A flowchart of charge current correction process
Figure 7:
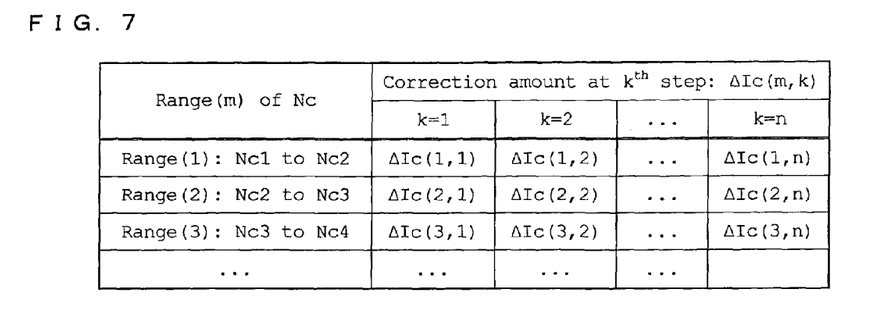
FIG. 7 An example of a charge current correction table

Next, a charge current correction process is described with reference to FIGS. 6 and 7. FIG. 6 is a flowchart showing one example of the charge current correction process. FIG. 7 is an example of a charge current correction table used for the charge current correction process.

In the example shown in FIGS. 6 and 7, the controller 18 is supposed to be equipped with a charge/discharge cycle counter that counts the number of charge/discharge cycles the secondary battery 12 has undergone. The frequency of use of the secondary battery 12 is represented by the number of charge/discharge cycles counted by the charge/discharge cycle counter. With regard to the number of charge/discharge cycles, for example, when a quantity of electricity corresponding to a predetermined percentage or more of the nominal capacity of the secondary battery is charged continuously, it is counted as "one time" by the counter.

Also, the deterioration ratio of the secondary battery, such as the reduction ratio of the capacity can be used as a parameter representing the frequency of use of the secondary battery 12, as described above. Alternatively, the internal resistance of the secondary battery 12 may be measured, so that the amount of increase in the internal resistance can be used as a parameter representing the frequency of use of the secondary battery 12.

In the charge current correction process of FIG. 6, a parameter representing the frequency of use of the secondary battery 12 is read. In this case, the number m of charge/discharge cycles counted by the charge/discharge cycle counter is read (S21). A charge current correction table is referred to using the number Nc of charge/discharge cycles and the value of variable k (1, 2, . . . , f), to read a correction amount $\Delta Ic(m,k)$ for optimizing the value of current Ic(k) (S22). The amount $\Delta Ic(m,k)$ is set according to the range(m) to which the number Nc of charge/discharge cycles belongs. Subsequently, the correction amount $\Delta Ic(m,k)$ is subtracted from the current Ic(k) (S23). The charge current for constant-current charging at each step is thus corrected and optimized according to an increase in the frequency of use (number of charge/discharge cycles) or internal resistance (polarization voltage) of the secondary battery 12.

Next, the charge current correction table of FIG. 7 is described. In the charge current correction table shown in the figure, the correction amount: $\Delta Ic(m,k)$ in the constant-current charging at the $k^{th}$ step is set according to the range(m) (range(1), range(2), . . . ) to which the number Nc of charge/discharge cycles belongs. In the example shown in the figure, $\Delta Ic(1,1), \Delta Ic(1,2), \ldots, \Delta Ic(1,f+1)$ are set for the range(1) of Nc1 to Nc2 (equal to or more than Nc1 and less than Nc2); $\Delta Ic(2,1), \Delta Ic(2,2), \ldots, \Delta Ic(2,f+1)$ are set for the range(2) of Nc2 to Nc3 (equal to or more than Nc2 and less than Nc3); and $\Delta Ic(3,1), \Delta Ic(3,2), \ldots, \Delta Ic(3,f+1)$ are set for the range(3) of Nc3 to Nc4 (equal to or more than Nc3 and less than Nc4). Here, Nc1<Nc2< . . . ; and Nc2−Nc1=Nc3−Nc2= . . . =constant Nf (Nf=1, 2, . . . ). For example, when Nf=1, the charge current can be corrected every time when the number Nc of charge/discharge cycles is increased by "one", by the amount $\Delta Ic(m,k)$ which is different every time.

Alternatively, even when Nf=1, the charge current (lower limit current) may be allowed to remain uncorrected until the number Nc of charge/discharge cycles reaches a predetermined number of cycles (e.g., 10 cycles). For example, given that Nc1=10, the correction amounts may be all set to value "0" while the number Nc of charge/discharge cycles is smaller than 10, or given that Nc1=1, the correction amounts $\Delta Ic(m,k)$ in the ranges (1) to (9) may be all set to value "0".

Here, the relationship "Ic(1)>Ic(2)> . . . " holds. Therefore, if the rate $\alpha$, at which the current Ic(k) being the charge current for constant-current charging is reduced according to the frequency of use or the number of charge/discharge cycles of the battery, is set to be the same value in all k steps, the following relationship holds with regard to the correction amounts $\Delta Ic(m,k)$: $\Delta Ic(m,1) > \Delta Ic(m,2) > \ldots > \Delta Ic(m,n)$. In short, in the above-mentioned case, the correction amount $\Delta Ic(m,k)$ is decreased as the number k of charging steps is increased.

Furthermore, as mentioned above, the rate of increase in the internal resistance of the non-aqueous electrolyte secondary battery associated with repeated charge and discharge is high in the early stage of charge/discharge cycles, and thereafter, the rate drops gradually. With this taken into consideration, if the rate $\alpha$ is decreased gradually with increase in the frequency of use or the number of charge/discharge cycles, the following relationship holds with regard to the correction amounts $\Delta Ic(m,k)$: $\Delta Ic(1,k)/\Delta Ic(2,k) > \Delta Ic(2,k)/\Delta Ic(3,k) > \ldots > 1$, where $\Delta Ic(1,k) < \Delta Ic(2,k) < \ldots$.

The method of correcting the charge current is not limited to the above. For example, the charge current may be corrected as follows: a specific correction amount or correction factor is calculated based on the data obtained in advance of the secondary battery, such as the deterioration speed of the secondary battery; and every time when the number Nc of charge/discharge cycles is increased by "1", the above correction amount is subtracted from the initial charge current, or the initial charge current is multiplied by the above correction factor.

Examples of the present invention are described below. The present invention, however, is not limited to the following examples.

Example 1

A cylindrical lithium ion secondary battery as shown in FIG. 2 was produced by the following procedures.

(1) Production of Positive Electrode

First, 100 parts by weight of $LiNi_{0.8}Co_{0.15}Al_{0.05}O_2$ serving as a positive electrode active material, 1.7 parts by weight of polyvinylidene fluoride serving as a binder, 2.5 parts by weight of acetylene black serving as a conductive material, and an appropriate amount of N-methyl-2-pyrrolidone were stirred in a double arm kneader, to prepare a positive electrode paste.

The positive electrode active material had been prepared as follows. To an aqueous $NiSO_4$ solution, Co sulfate and Al sulfate were added in a predetermined ratio, to prepare a saturated aqueous solution. To the saturated aqueous solution, while being stirred, an aqueous sodium hydroxide solution was slowly added dropwise to neutralize the saturated aqueous solution. A precipitate of a hydroxide $Ni_{0.8}Co_{0.15}Al_{0.05}(OH)_2$ was prepared by coprecipitation. The resultant precipitate was separated by filtration, washed with water, and dried at 80° C. To the hydroxide, a monohydrate of lithium hydroxide was added such that the total mole number of Ni, Co and Al became equal to the mole number of Li, and heated at 800° C. in dry air for 10 hours. $LiNi_{0.8}Co_{0.15}Al_{0.05}O_2$ was thus prepared.

Subsequently, the positive electrode paste was applied onto both surfaces of a 15-μm-thick positive electrode current collector made of aluminum foil, and dried, to form a positive electrode active material layer on each of both surfaces of the positive electrode current collector. A sheet-like positive electrode was thus produced. The positive electrode was rolled and cut into a belt-like positive electrode (thickness: 0.128 mm, width: 57 mm and length: 667 mm).

(2) Production of Negative Electrode

First, 100 parts by weight of graphite serving as a negative electrode active material, 0.6 parts by weight of PVDF serving as a binder, 1 part by weight of carboxymethyl cellulose serving as a thickener, and an appropriate amount of water were stirred in a double arm kneader, to prepare a negative electrode paste. Subsequently, the negative electrode paste was applied onto both surfaces of an 8-μm-thick negative electrode current collector made of copper foil, and dried, to form a negative electrode active material layer on both surfaces of the negative electrode current collector. A sheet-like negative electrode was thus produced. The negative electrode was rolled and cut into a belt-like negative electrode (thickness: 0.155 mm, width: 58.5 mm and length: 745 mm).

(3) Preparation of Non-Aqueous Electrolyte $LiPF_6$ was dissolved at a concentration of 1 mol/L in a non-aqueous solvent of 1:1:8 (volume ratio) ethylene carbonate, methyl ethyl carbonate, and dimethyl carbonate, to prepare a non-aqueous electrolyte.

(4) Fabrication of Battery

The positive and negative electrodes obtained in the above (1) and (2) were spirally wound together with a separator for insulating them from each other, to form an electrode group. For the separator, a 16-μm-thick polypropylene microporous film was used. The electrode group was inserted into a bottomed cylindrical battery case (diameter: 18 mm and height: 65 mm). On the top and the bottom of the electrode group, upper and lower electrically insulating plates were disposed, respectively. The non-aqueous electrolyte prepared in the above was injected into the battery case. A negative electrode lead extended from the negative electrode was welded to the inner bottom surface of the battery case, and a positive electrode lead extended from the positive electrode was welded to the undersurface of the sealing plate assembly. The opening end of the battery case was crimped onto the peripheral portion of the sealing plate assembly with a gasket interposed therebetween, to seal the opening of the battery case. A 18650-size cylindrical lithium ion secondary battery (diameter: 18 mm, height: 65 mm and rated capacity: 2000 mAh) was thus fabricated.

(5) Formation of Battery Pack

Six batteries thus fabricated were electrically connected into a battery assembly (two batteries in parallel X three in series). The battery assembly was equipped with a battery management unit (BMU), to form a battery pack.

(6) Charge/Discharge Cycle Life Test

The battery pack thus formed was subjected to the following charge/discharge cycle life test. Specifically, the battery pack was charged at a constant current of 0.7 It until the charge voltage reached the upper limit voltage of 12.0 V (the upper limit voltage per battery being 4.0 V) (the $1^{st}$ constant-current charging).

The battery pack was subsequently charged at a constant voltage of 12.0 V until the charge current decreased to the lower limit current of 0.5 It (the $1^{st}$ constant-voltage charging).

Next, the battery pack was charged at a constant current of 0.5 It until the charge voltage reached the upper limit voltage of 12.3 V (the upper limit voltage per battery being 4.1 V) (the $2^{nd}$ constant-current charging).

The battery pack was subsequently charged at a constant voltage of 12.3 V until the charge current decreased to the lower limit current of 0.3 It (the $2^{nd}$ constant-voltage charging).

Next, the battery pack was charged at a constant current of 0.3 It until the charge voltage reached the upper limit voltage of 12.6 V (the upper limit voltage per battery being 4.2 V) (the $3^{rd}$ constant-current charging).

The battery pack was subsequently charged at a constant voltage of 12.6 V until the charge current decreased to the lower limit current (charge termination current) of 50 mA (the $3^{rd}$ constant-voltage charging).

Constant-current charging and constant-voltage charging were each performed in three steps as above, to complete the charge for the first time. The battery pack was allowed to stand for 20 minutes, and then discharged at a constant current with the discharge current per battery being controlled at 1.0 It. When the discharge voltage was decreased to an end-of-discharge voltage of 7.5 V (the end-of-discharge voltage per battery being 2.5 V), the discharge was stopped.

The above charge and discharge was taken as one cycle, and total 300 charge and discharge cycles were performed.

At this time, the charge current correction process was performed as follows. Provided that the capacity retention rate at the $300^{th}$ charge and discharge cycle was 76%, a correction factor Ics ($=1-\alpha$, a fixed value) for the charge current in each cycle was calculated. This gave Ics≈0.99908. The above Ic(1), Ic(2) and Ic(3) were multiplied by the correction factor Ics every time when the number of cycles is increased by "1", to give a charge current at each step in each cycle. For example, the charge current at the $1^{st}$ step in the $m^{th}$ cycle is denoted by I(m,1), the I(m,1) can be calculated from the following formula (1):

$$I(m,l)=Ic(1) \times Ics^{m-1} \qquad (1).$$

Here, the number of cycles was counted by utilizing the charge/discharge cycle counting function of the BMU in the battery back.

Example 2

The charge/discharge cycle life test was performed in the same manner as in Example 1, except that a battery including $LiCoO_2$ as the positive electrode active material (rated capacity: 1800 mAh) was used, and the end-of-discharge voltage was set to 9.0 V (the end-of-discharge voltage per battery being 3.0 V).

Example 3

The charge/discharge cycle life test was performed in the same manner as in Example 1, except that the upper limit voltage for the $1^{st}$ constant-current charging was set to 11.4 V (the upper limit voltage per battery being 3.8 V).

Example 4

The charge/discharge cycle life test was performed in the same manner as in Example 1, except that the charge current for the $1^{st}$ constant-current charging was set to 2.0 It.

Example 5

The upper limit voltage for the $2^{nd}$ constant-current charging was set to 12.6 V (the upper limit voltage per battery being 4.2 V) and the charge current was set to 0.3 It. The charge voltage for the $2^{nd}$ constant-voltage charging was set to 12.6 V (the charge voltage per battery being 4.2 V), and the lower limit current (end-of-charge current) per battery was set to 50 mA. The $3^{rd}$ constant-current charging and constant-voltage charging were not performed. The charge/discharge cycle life test was performed in the same manner as in Example 1, except for the above.

Example 6

$LiCoO_2$ was used as the positive electrode active material. The upper limit voltage for the $2^{nd}$ constant-current charging was set to 13.2 V (the upper limit voltage per battery being 4.4 V) and the charge current was set to 0.3 It. The charge voltage for the $2^{nd}$ constant-voltage charging was set to 13.2 V (the charge voltage per battery being 4.4 V), and the lower limit current (end-of-charge current) per battery was set to 50 mA. The $3^{rd}$ constant-current charging and constant-voltage charging were not performed. The charge/discharge cycle life test was performed in the same manner as in Example 1, except for the above.

Comparative Example 1

The charge/discharge cycle life test was performed in the same manner as in Example 1, except that in the charge current correction process, only the charge current for the $1^{st}$ constant-current charging was corrected, and the upper limit voltages for constant-current charging at the $2^{nd}$ and subsequent steps was not corrected and the lower limit currents for constant-voltage charging at the $1^{st}$ and subsequent steps were not corrected.

Comparative Example 2

The charge/discharge cycle life test was performed in the same manner as in Example 2, except that in the charge current correction process, only the charge current for the $1^{st}$ constant-current charging was corrected, and the upper limit voltages for constant-current charging at the $2^{nd}$ and subsequent steps and the lower limit currents for constant-voltage charging at the $1^{st}$ and subsequent steps were not corrected.

Comparative Example 3

The charge/discharge cycle life test was performed in the same manner as in Example 3, except that in the charge current correction process, only the charge current for the $1^{st}$ constant-current charging was corrected, and the upper limit voltages for constant-current charging at the $2^{nd}$ and subsequent steps and the lower limit currents for constant-voltage charging at the $1^{st}$ and subsequent steps were not corrected.

Comparative Example 4

The charge/discharge cycle life test was performed in the same manner as in Example 4, except that in the charge current correction process, only the charge current for the $1^{st}$ constant-current charging was corrected, and the upper limit voltages for constant-current charging at the $2^{nd}$ and subsequent steps and the lower limit currents for constant-voltage charging at the $1^{st}$ and subsequent steps were not corrected.

Comparative Example 5

The charge/discharge cycle life test was performed in the same manner as in Example 5, except that in the charge current correction process, only the charge current for the $1^{st}$ constant-current charging was corrected, and the upper limit voltages for constant-current charging at the $2^{nd}$ and subsequent steps and the lower limit currents for constant-voltage charging at the $1^{st}$ and subsequent steps were not corrected.

Comparative Example 6

The charge/discharge cycle life test was performed in the same manner as in Example 6, except that in the charge current correction process, only the charge current for the $1^{st}$ constant-current charging was corrected, and the upper limit voltages for constant-current charging at the $2^{nd}$ and subsequent steps and the lower limit currents for constant-voltage charging at the $1^{st}$ and subsequent steps were not corrected.

Comparative Example 7

The charge/discharge cycle life test was performed in the same manner as in Example 1, except that the charge current correction process was not performed in the constant-current charging and the constant-voltage charging at all steps.

The charging time at the $1^{st}$ cycle, the charging time at the $300^{th}$ cycle, and the capacity retention rate of the battery packs of Examples 1 to 6 and Comparative Examples 1 to 7 were determined. The results are shown in Tables 1 and 2. The capacity retention rate Cc (%) was calculated from the following formula (2):

$$Cc = [Cd(300)/Cd(1)] \times 100 \qquad (2),$$

where Cd(300) is a discharge capacity at the $300^{th}$ cycle, and Cd(1) is a discharge capacity at the $1^{st}$ cycle.

TABLE 1

| | | 1st step | | | 2nd step | | |
| | | Constant-current charging | | | Constant-current charging | | |
| | Positive electrdoe active material | Charge current | Upper limit voltage | Current correction | Charge current | Upper limit voltage | Current correction |
|---|---|---|---|---|---|---|---|
| Ex. 1 | $LiNi_{0.8}Co_{0.15}Al_{0.05}O_2$ | 0.7 It | 12.0 V | With | 0.5 It | 12.3 V | With |
| Com. Ex. 1 | | 0.7 It | 12.0 V | With | 0.5 It | 12.3 V | Without |
| Ex. 2 | $LiCoO_2$ | 0.7 It | 12.0 V | With | 0.5 It | 12.3 V | With |
| Com. Ex. 2 | | 0.7 It | 12.0 V | With | 0.5 It | 12.3 V | Without |
| Ex. 3 | $LiNi_{0.8}Co_{0.15}Al_{0.05}O_2$ | 0.7 It | 11.4 V | With | 0.5 It | 12.3 V | With |
| Com. Ex. 3 | | 0.7 It | 11.4 V | With | 0.5 It | 12.3 V | Without |
| Ex. 4 | $LiNi_{0.8}Co_{0.15}Al_{0.05}O_2$ | 2.0 It | 12.0 V | With | 0.5 It | 12.3 V | With |
| Com. Ex. 4 | | 2.0 It | 12.0 V | With | 0.5 It | 12.3 V | Without |
| Ex. 5 | $LiNi_{0.8}Co_{0.15}Al_{0.05}O_2$ | 0.7 It | 12.0 V | With | 0.3 It | 12.6 V | With |
| Com. Ex. 5 | | 0.7 It | 12.0 V | With | 0.3 It | 12.6 V | Without |
| Ex. 6 | $LiCoO_2$ | 0.7 It | 12.0 V | With | 0.3 It | 13.2 V | With |
| Com. Ex. 6 | | 0.7 It | 12.0 V | With | 0.3 It | 13.2 V | Without |
| Com. Ex. 7 | $LiNi_{0.8}Co_{0.15}Al_{0.05}O_2$ | 0.7 It | 12.0 V | With | 0.5 It | 12.3 V | Without |

TABLE 2

| | 3rd step | | | Charging | | |
| | Constant-current charging | | Current correction | End-of-charge current | Charging time at 1st cycle (min) | Charging time at 300th cycle (min) | Capacity retention rate (%) |
| | Charge current | Upper limit voltage | | | | | |
|---|---|---|---|---|---|---|---|
| EX. 1 | 0.3 It | 12.6 V | With | 50 mA | 164 | 169 | 78 |
| Com. EX. 1 | 0.3 It | 12.6 V | Without | 50 mA | 164 | 172 | 69 |
| EX. 2 | 0.3 It | 12.6 V | With | 50 mA | 168 | 174 | 75 |
| Com. EX. 2 | 0.3 It | 12.6 V | Without | 50 mA | 168 | 176 | 71 |
| EX. 3 | 0.3 It | 12.6 V | With | 50 mA | 179 | 184 | 78 |
| Com. EX. 3 | 0.3 It | 12.6 V | Without | 50 mA | 179 | 187 | 74 |
| EX. 4 | 0.3 It | 12.6 V | With | 50 mA | 144 | 153 | 75 |
| Com. EX. 4 | 0.3 It | 12.6 V | Without | 50 mA | 144 | 154 | 63 |
| EX. 5 | — | — | — | 50 mA | 176 | 180 | 77 |
| Com. EX. 5 | — | — | — | 50 mA | 176 | 184 | 73 |
| EX. 6 | — | — | — | 50 mA | 185 | 189 | 75 |
| Com. EX. 6 | — | — | — | 50 mA | 185 | 193 | 69 |
| Com. EX. 7 | 0.3 It | 12.6 V | Without | 50 mA | 164 | 183 | 68 |

Table 1 shows that Examples 1 to 7 were all capable of achieving a favorable capacity retention rate. In Example 1 in which the charge current for constant-current charging at each step was decreased according to the reduction ratio of the discharge capacity, the charging time at the 300th cycle was shorter than that in Comparative Example 7 in which the charge current for constant-current charging at each step was kept constant. The capacity retention rate was also more favorable in Example 1.

The foregoing results show that decreasing the charge current for constant-current charging at each step with increase in the number of cycles enables the charging time to be shortened, and the deterioration in cycle characteristics to be suppressed.

Moreover, in Example 1, the deterioration in cycle characteristics was more effectively suppressed, as compared with the battery pack of Comparative Example 1 in which only the charge current at the 1st constant-current charging was decreased. Likewise, in Examples 3 and 4, the deterioration in cycle characteristics was more effectively suppressed, as compared with Comparative Examples 3 and 4. A similar tendency was observed in Example 5 in which the constant-current charging was performed in two steps only and Examples 2 and 6 in which $LiCoO_2$ was used as the positive electrode active material, as compared with Comparative Examples 5, 2 and 6.

The foregoing results show that the charging method of the present invention can shorten the charging time and improve the cycle life characteristics at the same time.

INDUSTRIAL APPLICABILITY

The non-aqueous electrolyte secondary battery employing the charging method of the present invention is suitably applicable as a power source for electronic devices such as portable devices and information devices.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

REFERENCE SIGNS LIST

10 Battery pack
12 Secondary battery
14 Charge/discharge circuit
16 Voltage detector
17 Current detector
18 Controller
24 Lithium ion secondary battery
26 Positive electrode

The invention claimed is:

1. A charging method for one or more non-aqueous electrolyte secondary batteries, the method comprising n steps of constant-current charging processes, said n steps comprising:
  (1) charging the one or more secondary batteries at a current Ic(k) until a charge voltage per one battery reaches a voltage Ec(k), where k is an integer equal to or greater than 1 and equal to or smaller than n−1 where n≥2; and
  (2) when the charge voltage per one battery reaches the voltage Ec(k), charging the one or more secondary batteries at a current Ic(k+1) smaller than the current Ic(k) until the charge voltage per one battery reaches a voltage Ec(k+1) higher than the voltage Ec(k), wherein
  the current Ic(k) and the current Ic(k+1) are determined according to frequency of use or number of charge and discharge cycles of the one or more secondary batteries.

2. The charging method for one or more non-aqueous electrolyte secondary batteries according to claim 1, the method further comprising:
  after the charge voltage per one battery reaches the voltage Ec(k), charging the one or more secondary batteries at the voltage Ec(k) until a charge current decreases to the current Ic(k+1); and
  after the charge voltage per one battery reaches the voltage Ec(k+1), charging the one or more secondary batteries at the voltage Ec(k+1) until the charge current decreases to a current Ic(k+2).

3. The charging method for one or more non-aqueous electrolyte secondary batteries according to claim 1, wherein the current Ic(k) and the current Ic(k+1) are decreased every time when the frequency of use or the number of charge and discharge cycles is increased by a certain number.

4. The charging method for one or more non-aqueous electrolyte secondary batteries according to claim 3, wherein the current Ic(k) and the current Ic(k+1) are decreased at a common rate every time when the frequency of use or the number of charge and discharge cycles is increased by a certain number, and the rate is lowered gradually as the frequency of use or the number of charge and discharge cycles is increased.

5. The charging method for one or more non-aqueous electrolyte secondary batteries according to claim 1, wherein when the frequency of use or the number of charge and discharge cycles reaches a predetermined number, the current Ic(k) and the current Ic(k+1) are each decreased to be smaller than initial values of the current Ic(k) and the current Ic(k+1).

6. The charging method for one or more non-aqueous electrolyte secondary batteries according to claim 1, wherein a ratio Ic(k+1)/Ic(k) of the current Ic(k+1) to the current Ic(k) is equal to or greater than 0.1 and equal to or smaller than 0.75.

7. The charging method for one or more non-aqueous electrolyte secondary batteries according to claim 1, wherein:
  the one or more secondary batteries comprise a positive electrode, a negative electrode, and a non-aqueous electrolyte; and
  the positive electrode includes a material represented by the general formula: $LiNi_xCo_yM_{1-x-y}O_2$, where M is at least one element selected from the group consisting of group 2 elements, group 3 elements, group 4 elements, group 7 elements, and group 13 elements in the long form of the periodic table, 0.3≤x≤1, and 0<y<0.4.

8. The charging method for one or more non-aqueous electrolyte secondary batteries according to claim 7, wherein:
  when the number of total steps of the constant-current charging processes is "f", the current Ic(f) is equal to or above 0.3 It and equal to or below 0.7 It, and the voltage Ec(f) is above 4 V and equal to or below 4.4 V, where It=a rated capacity/X, X being a length of time in which a quantity of electricity corresponding to the rated capacity is charged or discharged.

9. The charging method for one or more non-aqueous electrolyte secondary batteries according to claim 1, wherein:
  when k=1, the current Ic(k) is equal to or above 0.7 It and equal to or below 2 It, and the voltage Ec(k) is equal to or above 3.8 V and equal to or below 4 V, where It=a rated capacity/X, X being a length of time in which a quantity of electricity corresponding to the rated capacity is charged or discharged.

10. A battery pack comprising:
  one or more non-aqueous electrolyte secondary batteries;
  a charge circuit configured to charge the one or more secondary batteries with electric power from an outer power source; and
  a controller configured to control the charge circuit, wherein:
  the controller controls the charge circuit such that the one or more secondary batteries are charged by n steps of constant-current charging processes, the n steps comprising:
  (1) charging the one or more secondary batteries at a current Ic(k) until a charge voltage per one battery reaches a voltage Ec(k), where k is an integer equal to or greater than 1 and equal to or smaller than n−1 where n≥2; and
  (2) when the charge voltage per one battery reaches the voltage Ec(k), charging the one or more secondary batteries at a current Ic(k+1) smaller than the current Ic(k) until the charge voltage per one battery reaches a voltage Ec(k+1) higher than the voltage Ec(k), and
  the controller determines the current Ic(k) and the current Ic(k+1) according to frequency of use or number of charge and discharge cycles of the one or more secondary batteries.

11. The battery pack of claim 10, wherein the controller is further controller configured to control the charge circuit to:
  after the charge voltage per one battery reaches the voltage Ec(k), charge the one or more secondary batteries at the voltage Ec(k) until a charge current decreases to the current Ic(k+1); and
  after the charge voltage per one battery reaches the voltage Ec(k+1), charge the one or more secondary batteries at the voltage Ec(k+1) until the charge current decreases to a current Ic(k+2).

12. The battery pack of claim 10, wherein the controller decreases the current Ic(k) and the current Ic(k+1) every time when the frequency of use or the number of charge and discharge cycles is increased by a certain number.

13. The battery pack of claim 12, wherein the controller decreases the current Ic(k) and the current Ic(k+1) at a common rate every time when the frequency of use or the number of charge and discharge cycles is increased by a certain number, and lowers the rate gradually as the frequency of use or the number of charge and discharge cycles is increased.

14. The battery pack of claim 10, wherein when the frequency of use or the number of charge and discharge cycles reaches a predetermined number, the controller decreases the current Ic(k) and the current Ic(k+1) decreased to be smaller than initial values of the current Ic(k) and the current Ic(k+1), respectively.

15. The battery pack of claim 10, wherein a ratio Ic(k+1)/Ic(k) of the current Ic(k+1) to the current Ic(k) is equal to or greater than 0.1 and equal to or smaller than 0.75.

16. The battery pack of claim 10, wherein:
when k=1, the current Ic(k) is equal to or above 0.7 It and equal to or below 2 It, and the voltage Ec(k) is equal to or above 3.8 V and equal to or below 4 V, where It=a rated capacity/X, X being a length of time in which a quantity of electricity corresponding to the rated capacity is charged or discharged.

17. The battery pack of claim 10, wherein:
when the number of total steps of the constant-current charging processes is "f", the current Ic(f) is equal to or above 0.3 It and equal to or below 0.7 It, and the voltage Ec(f) is above 4 V and equal to or below 4.4 V, where It=a rated capacity/X, X being a length of time in which a quantity of electricity corresponding to the rated capacity is charged or discharged.

18. The battery pack of claim 10, further comprising:
a charge/discharge cycle counter that counts the number of charge and discharge cycles.

* * * * *